INVENTOR.
WILLIAM C. HARRIS
BY
Marshall J. Breen
ATTORNEY

WITNESS
Nicholas Leszczak

Oct. 4, 1966 W. C. HARRIS 3,277,312

DIFFERENTIAL RESPONSE CIRCUIT

Filed July 3, 1963 2 Sheets-Sheet 2

INVENTOR.
WILLIAM C. HARRIS

WITNESS
Nicholas Leszczak

BY
Marshall J. Breen
ATTORNEY 3,277,312
Patented Oct. 4, 1966

3,277,312

DIFFERENTIAL RESPONSE CIRCUIT

William C. Harris, Huntington, Conn., assignor to The Singer Company, New York, N.Y., a corporation of New Jersey Filed July 3, 1963, Ser. No. 292,638
5 Claims. (Cl. 307—88.5)

The present invention relates to circuits for providing a change of state of an output device suitable to perform a control function whenever an input signal deviates more than some specified amount from a reference value.

Circuits of this type are generally encountered in intrusion alarm equipment of all kinds and the difficulties involve response to the rate of change and the sense of the change of the input signal indicative of alarm conditions. The rate of change problem is a matter of providing adequate sensitivity to slowly changing signals, that is, providing good low-frequency response or in some cases, response to D.C.

The sense of change should, in general, have no effect on sensitivity. This implies a rectification process, or a differential arrangement such as a conventional differential relay or a double contact instrument relay. The latter items tend to be expensive, bulky, and delicate whereas the rectifying arrangement requires either a capacitive coupling arrangement or a floating power supply. Capacitive coupling immediately introduces the low frequency response problem and the floating power supply means increased cost, bulk and complexity particularly if many alarm circuits are involved.

The circuit of the present invention represents the simultaneous solution of these conflicting problems and has attributes which recommend its use as an essential part of any type of equipment involving the detection of slowly changing signals such as space or perimeter intrusion alarms, line supervisory devices or monitors, and industrial or other control equipment.

It is an object of this invention to provide a differential circuit having no critical, unusual or expensive components, which circuit may be used to operate a general purpose, single winding relay responsively to the absolute difference between two D.C. input signals.

It is a further object of this invention to provide a circuit of the above type in which the signal and power circuits have a common terminal.

It is a still further object of this invention to provide a circuit of the above type in which the frequency response may be readily extended to very low frequencies or to D.C., depending on the arrangement of the input circuit.

With the above and other objects in view, as will hereinafter appear, the invention comprises the devices, combinations and arrangements of parts hereinafter set forth and illustrated in the accompanying drawings of a preferred embodiment of the invention, from which the several features of the invention and the advantages attained thereby will be readily understood by those skilled in the art.

Figure 1:
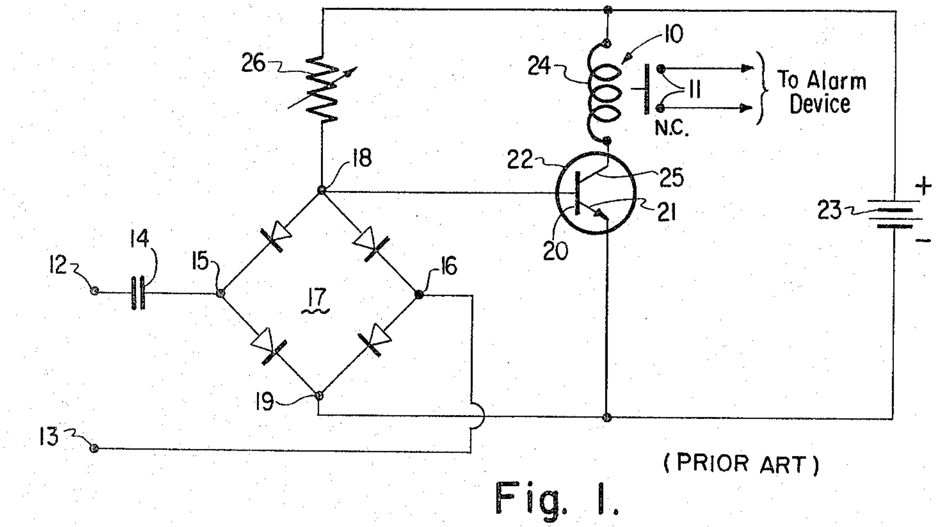
(PRIOR ART) Fig. 1.
FIG. 1 is a schematic circuit diagram illustrative of the prior art.

Referring now to FIG. 1 there is shown a prior art circuit for causing a relay 10 to drop out and close its contacts 11 responsively to a predetermined change indicative of an alarm condition in a D.C. voltage applied to input terminals 12, 13. In this circuit the input voltage is A.C. coupled through capacitor 14 to the input terminals 15, 16 of bridge rectifier 17. The output terminals 18, 19 are connected respectively to the base 20 and emitter 21 of an NPN transistor 22 and the polarity is such that inputs of either polarity to terminals 15, 16 result in applying a negative base-emitter bias to drive the transistor 22 in the direction of cutoff.

A battery 23 powers the transistor 22, and a load device (in this case a relay coil 24) is connected in series with the collector 25. A resistor 26 sets the normal current in the relay coil 24 under quiescent conditions (i.e. with zero bridge input) to a value just above that necessary to hold the relay picked up with contacts 11 open. Under these conditions, when the input voltage at terminals 12, 13 changes, indicative of an alarm condition, the transistor 22 is biased towards cutoff and the current in relay coil 24 is reduced to dropout value and contacts 11 close to excite an alarm device not shown.

Several disadvantages of this circuit are at once apparent. The capacitor 14 is a real problem. It must have a large capacitance value if good low frequency response is to be obtained. The maximum usable capacitance depends on leakage current which, if excessive, will cause an erroneous alarm. Even lesser amounts of leakage are detrimental as they bias the bridge and cause asymmetric response. Of course D.C. response cannot be obtained with this circuit.

Another disadvantage of the circuit of FIG. 1 is that there is no common connection between the battery 23 and the signal input voltage terminals 12, 13. This means that separate power supplies or some type of floating power supply must be used and this adds undesirable cost, bulk and complexity to the system.

Figure 2:
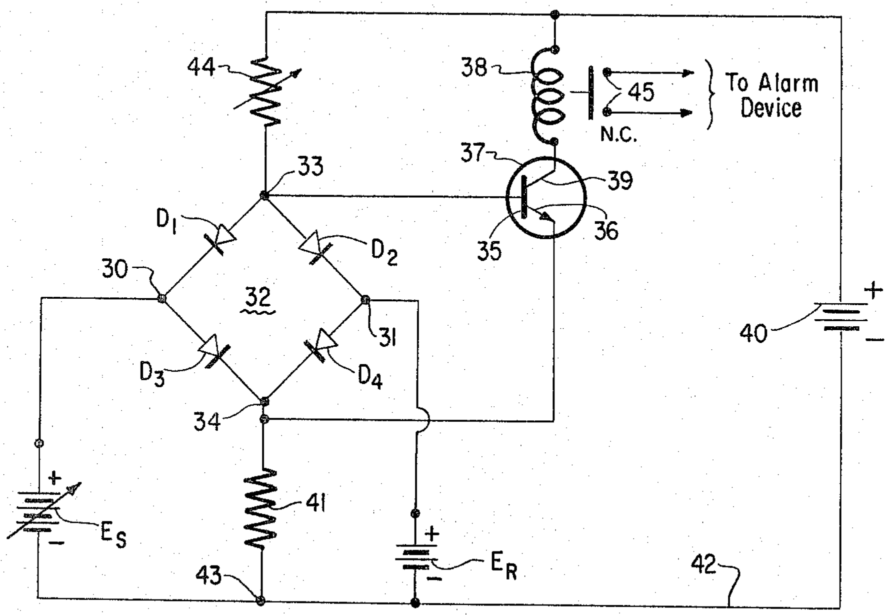
FIG. 2 is a schematic circuit diagram illustrating a preferred embodiment of the present invention.

FIG. 2 represents a circuit embodiment of the present invention which overcomes the above-noted difficulties.

In FIG. 2 an input signal voltage $E_S$ and a reference voltage $E_R$ are connected in series opposition across input terminals 30, 31 of a full-wave bridge rectifier 32 comprising diodes, $D_1$, $D_2$, $D_3$ and $D_4$. Output terminals 33, 34 of the bridge 32 are connected respectively to the base 35 and the emitter 36 of an NPN transistor 37. A load impedance (in this case shown as a relay coil 38) is connected between the collector 39 and one side of battery 40. A resistor 41 is connected between the emitter 36 and the other side of battery 40 which is connected by lead 42 to a point 43 which is common to both the signal input voltage $E_S$ and the reference voltage $E_R$. A resistor 44 sets the base-emitter bias of transistor 37 so that, under quiescent conditions (i.e. when $E_S=E_R$), the load current in relay coil 38 is of a predetermined amount necesary to hold the relay in picked-up condition with contacts 45 open.

It will be observed that, in the circuit of FIG. 2, the signal voltage $E_S$ is directly coupled to the bridge 32 and thus the circuit response extends to D.C. and no coupling capacitor with its inherent leakage problem is required. Further the input voltages $E_S$ and $E_R$ share a common connection with the power supply battery 40 which enables all supply voltages to be obtained from a single conventional supply source, as explained more fully below with respect to FIG. 3.

*Operation*

The operation of the circuit of FIG. 2 is as follows:

For quiescent (no alarm) conditions where $E_S=E_R$, current flows from the power supply 40 through resistor 44 and divides equally through silicon diodes $D_2$ and $D_1$ and the reference and input signal sources respectively.

Since the normal forward voltage drop for silicon diodes is substantially constant and approximately 0.6 volt for an order of magnitude change in current, the forward conduction of silicon diodes $D_2$ and $D_1$ above establishes the base 35 with respect to common point 43 at a potential approximately 0.6 volt more positive than the reference voltage $E_R$. Base bias current for base 35 of transistor 37 also flows through resistor 44 and combines with the collector current of transistor 37 to form the emitter current which flows through the emitter resistor 41.

It is necessary to select a value of resistance for resistor 41 such that the emitter current corresponding to a predetermined desired collector current will cause a voltage drop across resistor 41 substantially equal to the reference voltage $E_R$. Under these conditions diodes $D_3$ and $D_4$ will not conduct.

Now suppose that, due to an alarm condition, the signal voltage $E_S$ drops to a value below the reference voltage $E_R$. Increased current will flow through diode $D_1$, and resistor 44, the base voltage will drop and diode $D_2$ will be back-biased and will not conduct. The lowered base voltage will reduce the emitter current but the emitter voltage cannot continue to fall because it is clamped to the reference voltage by current flow through $D_4$. As the base voltage continues to fall with a clamped emitter, the base-emitter bias becomes insufficient to maintain the flow of collector current in the coil 38, the relay drops out and contacts 45 close to actuate an alarm device.

On the other hand suppose that, due to an alarm condition, the signal voltage $E_S$ increases to a value above the reference voltage $E_R$. The base remains clamped to the reference voltage $E_R$ by current flow through diode $D_2$, and diode $D_1$ is back-biased. Current will now flow through $D_3$ and resistor 41 to clamp the emitter to the higher signal voltage. This results in a reduced base-emitter bias voltage which is insufficient to maintain collector current and the relay drops out just as in the case of decreasing signal voltage above described.

The above action of this circuit may be summarized as follows:

If the input signal voltage changes its magnitude by a predetermined amount in either direction, current will flow through either diode $D_1$ or $D_2$, establishing the base 35 of transistor 37 with respect to common point 43 at a voltage 0.6 volt more positive than the more negative one of the signal or reference voltages. Similarly, current will now flow through either diode $D_3$ or $D_4$ causing the voltage at the emitter 36 of transistor 37 with respect to common point 43 to become 0.6 volt more negative than the more positive one of the signal or reference voltages. The net effect of this is to reduce the base-emitter voltage to a value which cuts off the flow of collector current in transistor 37 and therefore drops out relay 38 and closes contacts 45.

The importance of the emitter resistor 41 in this circuit is now established as it associates the emitter with one terminal of the input, permitting the power supply for transistor 37 to have a common terminal with the input, and permitting the reference voltage to be obtained from the same power supply as, for example, by resistive voltage dividers or Zener diodes. The current through resistor 41 is merely shifted from the transistor 37 to either the reference or the input source, whichever is more positive, whenever the reference and input differ by more than 0.6 volt for silicon diodes.

While the circuit of this embodiment of the invention has been shown associated with an NPN transistor, it is not to be construed as so limited and, as is well known to those skilled in this art, a PNP transistor may be used with equal effect by suitable reversal of voltage and diode polarities.

Figure 3:
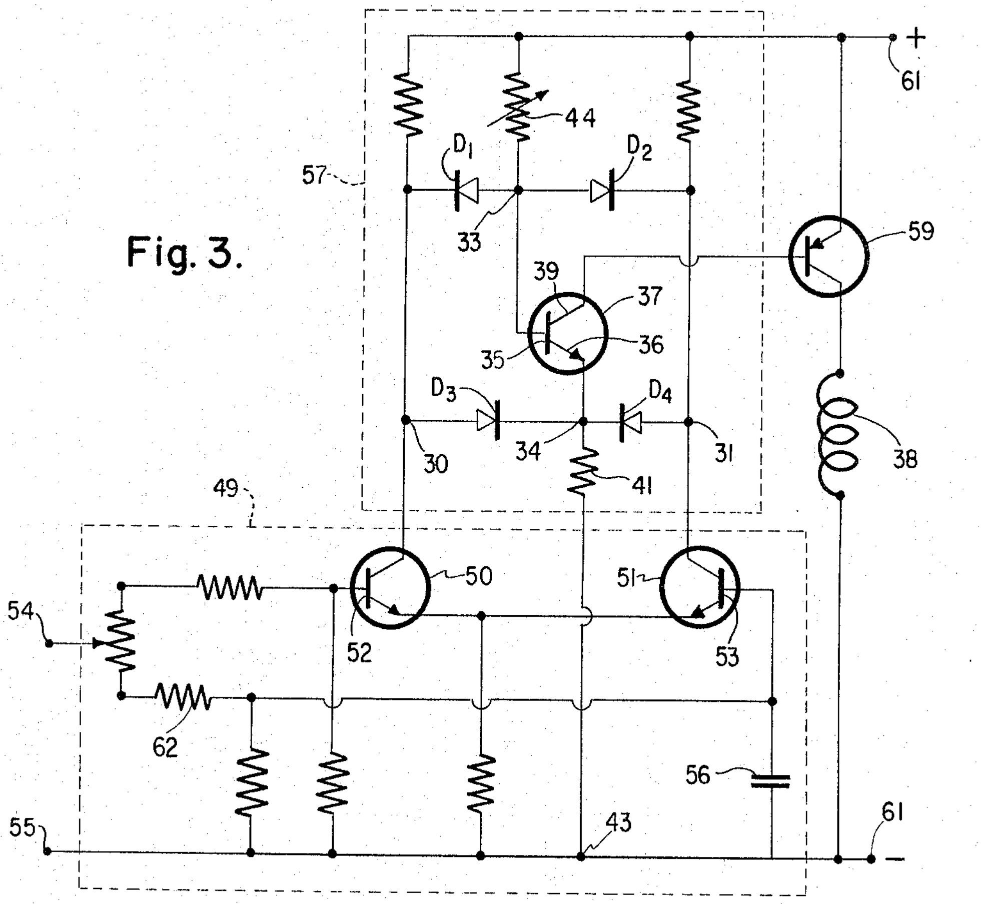
FIG. 3 is a schematic circuit diagram illustrating a modification of the circuit of FIG. 2.

FIG. 3 illustrates a more elaborate circuit for producing an output on changing input voltages but will not produce an output on very slow input drifts. The reference voltage is unspecified, being the time average of the input voltage. Very good low frequency response is obtainable with this circuit, the effect being that of a capacitive coupled system; but the performance is superior to capacitive coupling with regard to low frequency response and leakage problems.

Figure 4:
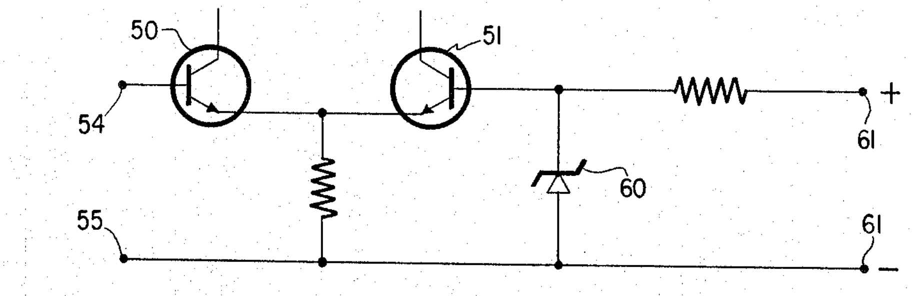
FIG. 4 is a schematic circuit diagram illustrating a modification of FIG. 3 to extend the response to D.C.

It will be seen from FIG. 3 that a conventional differential amplifier 49 comprising transistors 50, 51 is used to amplify the voltage difference between the inputs to the respective bases 52, 53. The input signal at terminals 54, 55 is coupled directly to base 52 but is coupled to base 53 through a long time constant circuit established by a large capacitor 56 and a resistor 62. This establishes at base 53 a reference voltage which can follow only very slow changes in the signal input and, for all other changes, represents, in effect, a fixed reference voltage. The output from the differential amplifier is impressed on the input terminals 30, 31 of a bridge circuit 57 which is the same as the basic circuit of FIG. 2 except that the load for transistor 37 is now the base-emitter junction of a PNP transistor 59, which is connected as a conventional current amplifier and permits larger load currents in the relay coil 38 to be controlled without causing adverse loading effects on the input signal. It will be noted that terminals 61 of a common power supply furnish power to all transistors.

Where it is desirable to extend the response to D.C. the circuit of FIG. 3 may be modified as shown in FIG. 4 where a fixed reference voltage is obtained from terminals 61 of the common power supply by conventional use of a Zener diode 60. It will be understood that the reference voltage need not be fixed but may be programmed to have any desired variation with time depending on requirements to be met.

Having thus set forth the nature of this invention, what I claim herein is:

1. A circuit for producing an output signal responsively to a predetermined difference between two input signals comprising a full-wave diode bridge rectifier having a pair of diametrically opposed input terminals and a pair of diametrically opposed output terminals, means connecting said input signals in series opposition directly across said pair of input terminals, a transistor having a base, an emitter, and a collector, said base and said emitter each being connected directly to a respective one of said output terminals, a power source having a common connection with each of said input signals, a load impedance connected in series with the collector and the end of said power voltage source opposite to said common connection end, a resistor connected between said common connection and the emitter of said transistor, and means for biasing said transistor to establish a predetermined quiescent current in said load impedance when said input signals are of substantially equal values.

2. A circuit for producing a change of state in an output device responsively to a predetermined difference between an input signal and a reference signal comprising diodes connected to form a full-wave bridge rectifier having input terminals and output terminals, means connecting the input signal and the reference signal in opposed series relation directly across said input terminals and forming a junction common to both signals, a transistor having a base, an emitter and a collector, means directly connecting one of said output terminals to said base and the other of said output terminals to said emitter, a D.C. voltage supply for said transistor, a load impedance connected in series between the collector and one end of said voltage supply, means connecting the other end of said voltage supply to the junction common to both input and reference signals, a resistor connected between the emitter and the common junction, and means for biasing said transistor to establish a predetermined quiescent current in said load impedance corresponding to an initial state of said output device when said input and reference signals are of substantially equal values.

3. A circuit for producing a current change in a load impedance responsively to a predetermined difference between the absolute values of two input signals comprising a single transistor having a base, an emitter and a collector, a voltage supply having at one end a common terminal with both of said input signals, a resistor connected between the emitter and said common terminal, means connecting a load impedance between the collector and the other end of said voltage supply, a diode, full-wave bridge rectifier having input terminals and output terminals, means connecting said input signals in series opposition directly across the input terminals of said bridge rectifier, means connecting the base and the emitter directly to the respective output terminals of said bridge rectifier and means for biasing said transistor to establish a predetermined quiescent current in said load impedance when said signal voltages are of substantially equal value.

4. A circuit in accordance with claim 3 in which the base is clamped to whichever input signal is more negative and the emitter is clamped to whichever input signal is more positive for differences in input signals greater than a predetermined value.

5. A circuit in accordance with claim 3 in which a predetermined unbalance in the input signals causes currents to be supplied to the emitter resistor directly from the input signals to reduce the base-emitter bias to cut off current flow in the load impedance.

References Cited by the Examiner

UNITED STATES PATENTS

| | | | |
|---|---|---|---|
| 3,063,018 | 10/1962 | Gordon et al. | 328—146 |
| 3,189,811 | 6/1965 | King | 307—88.5 |

JOHN W. HUCKERT, *Primary Examiner.*

J. D. CRAIG, *Assistant Examiner.*